United States Patent
Sausner et al.

(10) Patent No.: US 7,357,968 B2
(45) Date of Patent: Apr. 15, 2008

(54) REINFORCED, HIGH PRESSURE, LOW PERMEATION MULTILAYER HOSE

(75) Inventors: Andreas Sausner, Orion, MI (US); Tao Nie, Rochester, MI (US); Michael W. Boles, Springboro, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 836 days.

(21) Appl. No.: 10/256,621

(22) Filed: Sep. 27, 2002
(Under 37 CFR 1.47)

(65) Prior Publication Data

US 2004/0062895 A1   Apr. 1, 2004

(51) Int. Cl.
*B29D 22/00* (2006.01)
*B29D 23/00* (2006.01)
*B32B 1/08* (2006.01)

(52) U.S. Cl. ............... 428/36.91; 428/36.9; 428/35.7; 428/35.8; 138/172; 138/134; 138/143; 138/144; 138/153

(58) Field of Classification Search ............. 428/35.8, 428/35.9, 36.3, 36.6, 36.7, 36.9, 36.91, 37, 428/421, 422, 457, 458, 35.7; 138/134, 143, 138/144, 153, 172
See application file for complete search history.

(56) References Cited

U.S. PATENT DOCUMENTS

| | | | |
|---|---|---|---|
| 3,473,087 A | 10/1969 | Slade | 317/2 |
| 3,561,493 A | 2/1971 | Maillard et al. | 138/141 |
| 3,687,169 A * | 8/1972 | Reynard | |
| 3,813,313 A * | 5/1974 | Feucht et al. | 156/156 |
| 4,101,699 A | 7/1978 | Stine et al. | 428/36 |
| 4,111,237 A | 9/1978 | Mutzner et al. | 138/125 |
| 4,553,568 A | 11/1985 | Piccoli et al. | 138/125 |
| 4,773,452 A * | 9/1988 | Dotti et al. | 138/109 |
| 5,284,184 A | 2/1994 | Noone et al. | 138/121 |
| 5,372,163 A | 12/1994 | Kokuryu et al. | 138/126 |
| 5,374,089 A | 12/1994 | Davie et al. | 285/317 |
| 5,381,834 A | 1/1995 | King | 138/125 |
| 5,383,087 A | 1/1995 | Noone et al. | 361/215 |
| 5,437,311 A | 8/1995 | Reynolds | 138/115 |
| 5,460,771 A | 10/1995 | Mitchell et al. | 264/508 |
| 5,469,892 A | 11/1995 | Noone et al. | 138/121 |
| 5,520,223 A | 5/1996 | Iorio et al. | 138/140 |
| 5,524,673 A | 6/1996 | Noone et al. | 138/103 |
| 5,566,720 A | 10/1996 | Cheney et al. | 138/137 |
| 5,590,691 A | 1/1997 | Iorio et al. | 138/146 |
| RE35,527 E | 6/1997 | Martucci | 174/47 |
| 5,638,871 A | 6/1997 | Iorio et al. | 138/146 |
| 5,678,611 A | 10/1997 | Noone et al. | 138/137 |
| 5,718,459 A | 2/1998 | Davie et al. | 285/148.19 |
| 5,743,304 A | 4/1998 | Mitchell et al. | 138/137 |
| 5,771,940 A | 6/1998 | Iorio et al. | 138/146 |
| 5,865,218 A | 2/1999 | Noone et al. | 138/137 |
| 5,867,883 A | 2/1999 | Iorio et al. | 29/460 |
| 5,884,671 A | 3/1999 | Noone et al. | 138/137 |
| 5,884,672 A | 3/1999 | Noone et al. | 138/137 |
| 5,996,642 A | 12/1999 | Noone et al. | 138/137 |
| 6,003,562 A | 12/1999 | Iorio et al. | 138/138 |
| 6,109,306 A | 8/2000 | Kleinert | 138/127 |
| 6,155,304 A * | 12/2000 | Hsich et al. | |
| 6,170,534 B1 | 1/2001 | Noone et al. | 138/137 |
| 6,180,197 B1 | 1/2001 | Nie et al. | 428/36.91 |
| 6,257,281 B1 | 7/2001 | Nie et al. | 138/137 |
| 6,321,795 B1 | 11/2001 | Noone et al. | 138/137 |
| 6,378,562 B1 | 4/2002 | Noone et al. | 138/137 |

FOREIGN PATENT DOCUMENTS

DE      29709723 U1 *   7/1997

* cited by examiner

*Primary Examiner*—Michael Miggins
(74) *Attorney, Agent, or Firm*—Carlson, Gaskey & Olds

(57) ABSTRACT

A reinforced, high pressure hose is disclosed for use in the transport of high pressure fluids. The hose includes a multilayered inner tube capable of prolonged exposure to fluids such as those containing hydrocarbons, and a reinforcement layer overlaying the inner tube. The reinforcement layer includes at least one reinforcement strip wrapped about the inner tube and with the edges of the strip in an overlying relationship.

9 Claims, 2 Drawing Sheets

REINFORCED, HIGH PRESSURE, LOW PERMEATION MULTILAYER HOSE

FIELD OF THE INVENTION

The present invention relates to a flexible high pressure reinforced thermoplastic hose construction. The present invention more particularly relates to reinforced, high-pressure rated hoses having a low hydrocarbon permeation multilayer hose for use in a fuel hose or a brake hose as well as in aqueous fluid transport.

BACKGROUND OF THE INVENTION

Hose assemblies are used for a variety of applications such as hose assemblies for automotive brake lines and fuel lines as well as various non-automotive uses such as water delivery. The hose should be strong, durable and resistant to heat, chemical degradation, and high pressures. When hoses are used to carry organic fluids and vapor, as in fuel lines, the hose should be resistant to permeation by hydrocarbons contained in the fluids so transported. In order to be effective, fluid transport hoses should also be flexible and resistant to crushing, kinking or other events which can reduce cross-sectional area of the hose thereby blocking flow and creating localized areas of high stress within the hose as well as weak points in the hose which subsequently can leak.

Some hoses for fuel and vapor applications in motor vehicles have been multilayered tubes. Typically, hoses for high pressure applications are composed of fiber reinforced thermosetting plastic or rubber materials containing steel fibers, glass fibers or plastic fibers. Other reinforcement mechanisms include using fibers woven or braided around an inner tube. Production of reinforced braided hoses is complex and expensive. Additionally, braid-reinforced rubber hoses generally are not recyclable due to the cross-linking properties of the rubber materials employed.

The current multilayered tubing technology offers excellent low permeation tubes. Different plastic materials can either be extruded together or separately formed in a multilayered structured hose. However, such tubes typically lack necessary properties for high pressure applications such as kink resistance and the like. Heretofore, reinforcement of multi-layered polymeric tubes has been problematic. Coextrusion methods are difficult to apply over or around woven or braided reinforcement materials in a manner which will assure the necessary layer-to-layer integration required for optimum tubing function and structure.

It would be desirable to provide a reinforced tubing structure which is composed of materials which could be easily integrated into the multi-layer structure. Additionally, it would be desirable to provide a reinforced tube having a reinforcement layer which is amenable to various recycling processes when the tube is scraped or discarded. It is also desirable to provide a multi-layer tube having a reinforcement layer which can function as a suitable barrier to prevent hydrocarbon permeation through the tube. Finally, it is desirable to provide a reinforcement layer which permits a significant retention of the characteristics of the various polymeric layers, such as flexibility, electrostatic dissipation and the like.

SUMMARY OF THE INVENTION

The present invention is directed to a multi-layer tube comprising a first liquid contacting layer. The first layer is composed of a melt-processible thermoplastic material. The multi-layer tube also has a reinforcement layer disposed radially outward from the first layer in essentially overlying relationship thereto. The reinforcement layer is composed of at least one essentially continuous elongated strip of material which is typically positioned at an angle oblique to the longitudinal axis of the tube. The multi-layer tube may also include at least one outer layer composed of at least one melt-processible thermoplastic material; the outer layer disposed radially outward of the reinforcement layer be the construction of the present invention, the interrelationship between the first layer and reinforcement layer provides a multi-layer tube having low hydrocarbon permeation.

The reinforcement layer is composed of elongated material which is wrapped such that the respective edges of the elongated material are in overlying or overlapped relationship to one another. Additionally, it is within the purview of this invention that the reinforcement layer be composed of a plurality of elongated strips which are counter-wrapped relative one to the other. The material of choice for the reinforcement layer will be a material which, when positioned in wrapped overlying relationship, will provide an essentially uniform layer overlying the inner layer.

In the tube of the present invention, the elongated strip which composes the reinforcement layer is composed of a material selected from the group which includes highly oriented plastic film stocks and metal foils. Representative materials for use in the highly oriented plastic film stock include materials such as polyamides and polyesters.

In the tubing of the present invention, the reinforcement layer may have multiple wrap layers. Each wrap layer is composed of an elongated strip having two opposed longitudinal edges positioned such that opposed longitudinal edges are in contact with one another in an overlying relationship with the first wrap layer being wound in a first direction around the inner polymeric layer. The second wrap layer is an elongated strip having two opposed longitudinal edges positioned in an overlying relationship with the second wrap being wound in a second direction around the inner layer which differs from the winding direction of he first layer.

The at least one wrapped reinforced layer may be is positioned around at least one first or inner layer such that the wrapped reinforced layer forms the exterior or outwardly oriented surface of the tube. Alternately, the tubing of the present invention may have additional polymeric layers which overlay and are external to the wrapped layer.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
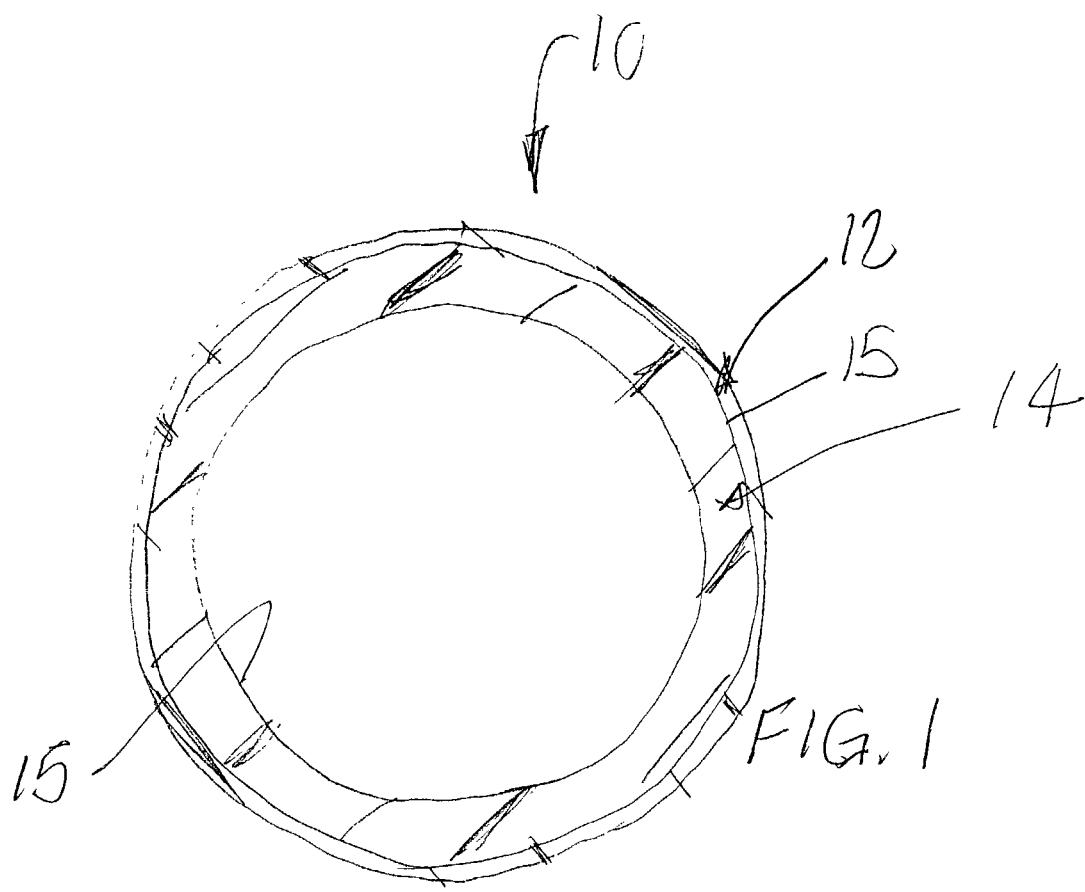
FIG. 1 is a cross-section of one embodiment of the tube of the present invention.
Figure 2:
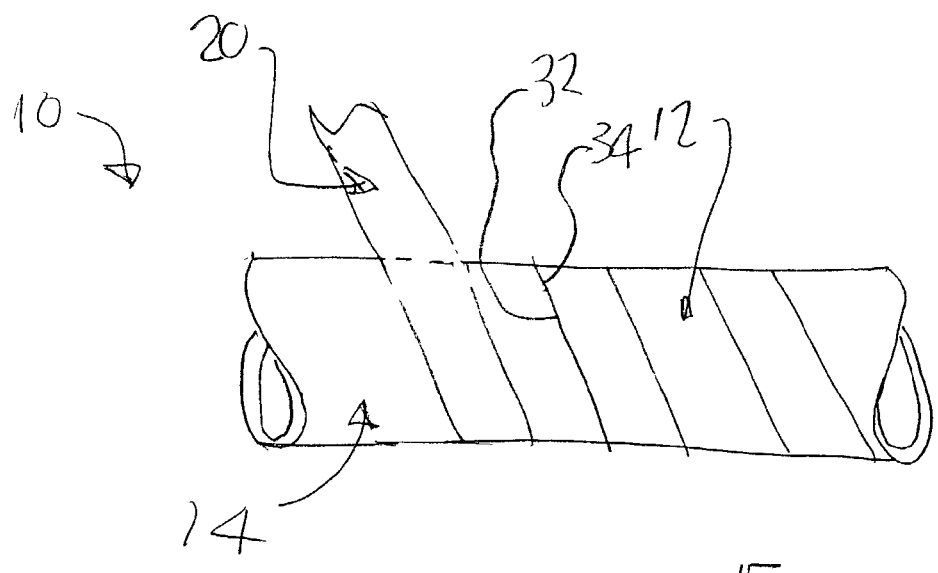
FIG. 2 is a schematic representation of the tube of the present invention depicting an extruded inner tube being wrapped by a single strip in one direction.

The present invention is a reinforced, high pressure hose for the transport of aqueous fluids or organic fluids such as those containing hydrocarbons. The reinforced hose 10 includes an inner layer 14 and a reinforcement layer 12 which is composed of at least one essentially continuous elongated strip 20 positioned around the inner layer 14. The elongated strip 20 which makes up the reinforcement layer 24 typically has two opposed longitudinal edges 32, 34 configured such that when the elongated strip 20 is wound around the inner tube, the edges 32, 34 are in an overlying relationship to one another. The reinforced, high pressure hose of the present invention typically exhibits low hydrocarbon permeation. As used herein, the term "low hydrocarbon permeation" is defined as a hydrocarbon permeation rate at or lower than 15 g/m$^2$/day 10, CM 15, SAE C fuel).

The inner layer 14 of the tube 10 may be formed by any suitable method such as by extruding suitable thermoplastic materials in an appropriate extrusion process or by paste extrusion process such as in the case of the manufacture of PTFE inner core tube. The inner layer 14 typically has an outer diameter up to 64 mm. However, in applications such as fuel lines and vapor recovery systems, outer diameters of up to 50 mm are employed. It is to be understood that tubing having various outer diameter may be produced as desired or required.

In the tube construction of the present invention, the inner layer region 14 has a surface 15 capable of prolonged exposure to a fluid containing hydrocarbons. The inner layer region 14 is composed of at least one layer of plastic material. The material employed in the inner layer 14 may be either thermoplastic or thermoset as desired or required.

The inner layer 14 may be a single polymeric layer or may be composed of multiple layers. Examples of multi-layered tubing constructions and suitable melt-processible thermoplastic materials include constructions and materials which are discussed in U.S. Pat. Nos. 3,063,857, 3,073,773 and 5,996,642.

Suitable thermoplastics which can be employed in at least one layer of the inner layer region 14 include fluoropolymers selected from the group which include at least one of polyvinylidine fluoride, polyvinyl fluoride, polychlorotrifluoroethylene, ethylenetetrafluoroethylene copolymers, graft copolymers of the preceding materials together with a fluorine-containing polymer such as copolymers of vinylidine fluoride and chlorotrifluoroethane. Where fluoropolymers are employed, typically preferred polymers include polyvinylidine fluoride (PVDF) and ethylene tetrafluoroethylene (ETFE). Suitable materials are commercially available from a variety of sources and are known to the artisan skilled in the art of preparing multiple layer thermoplastic fuel and vapor tubes.

The inner layer region 14 can also include at least one layer composed of a non-fluoroplastic material such as at least one from the group which includes polyamides, polyesters, polyarylene sulfide and thermoplastic elastomers. Suitable thermoplastic elastomers are known to the artisan skilled in multi-layer tubing use and construction. Examples of polyamide thermoplastics include at least one of the following: polyamide 12; polyamide 11; polyamide 6; and polyamide 6,6. Additionally, suitable thermoplastic polyester and/or polyarylene sulfides such as polyphenylene sulfide (PPS) materials can be employed in at least one layer of the inner layer region. Suitable polyarylene sulfides typically have a polymer backbone composed of a series of alternating aromatic rings and sulfur atoms, The aromatic rings are typically di-substituted in the para position and the sulfur atoms are present as divalent moieties.

The reinforcement strip 20 in the reinforcement layer 24 may be a continuous sheet or film or may be made out of a tightly or loosely woven fabric. Where a continuous film is employed, the reinforcement strip 20 may be made of a suitable highly oriented plastic or metal. The reinforcement strip may also be composed of an essentially continuous sheet of metal foil, highly oriented plastic or a metal matrix plastic composite material. As used herein, the term "essentially continuous" is defined as an elongated strip having sufficient length to be positioned around or relative to the inner layer region 14 in a manner which eliminates or significantly reduces discontinuities in the reinforcement strip material. Thus, the essentially continuous reinforcement strip can include starts and stops in the material provided that the material can be spliced or positioned in a manner which does not adversely affect the performance or function of the resulting tube.

The highly oriented plastic material employed in either the sheet or woven fibers may be any plastic material, either thermosetting or thermoplastic, which will possess and maintain either monoaxial or biaxial orientation. In the preferred embodiment, the plastic material is a material which possesses at least some degree of affinity with melt-processible thermoplastics employed in the inner layer region and/or the outer layer region. The reinforcement strip 20 preferably contains a material selected from the group which includes polyamides and polyesters. Preferred polyamides include polyamide 6 and polyamide 12.

Where materials such as polyamides and polyesters are employed, it has been found that the reinforced strip 20 can exhibit a natural bonding or affinity with materials employed in the inner layer region 14. Depending upon the degree of affinity, it is considered within the purview of this invention to integrate various bonding enhancing materials into the reinforcement strip 20 to assure proper integration between the inner layer region 14 and the reinforcement strip. "Integration" is taken to include blending and/or polymerizing bonding enhancing functionalities into the base material in the reinforcement strip 20 as well as the application of bonding enhancing materials to a surface or surfaces of the reinforcement strip 20.

The reinforcement strip 20 can also be composed of a metal foil material. In reinforcement strips composed of a woven fabric, the metal foil may be integrated as a thread or series of threads which are woven or otherwise integrated into a polymeric fabric structure. Alternately, the reinforcement strip may be composed of an essentially continuous sheet of metal foil. The reinforcement strip 20 containing or composed of a metal material is preferably bonded to the inner layer region. Thus, as desired or required, a suitable bonding agent can be integrated into the reinforcement strip 20 containing or composed of the metal foil to ensure that the reinforcement strip 20 bonds appropriately to the inner layer region 14. The optional bonding agent which can be integrated into or with the reinforcement strip 20 are suitable adhesives which would typically be known to the skilled artisan.

In the tubing construction of the present invention, the reinforcement strip 20 is wrapped around the inner layer region 14 in a manner such that the two opposed edges 32, 34 of the strip 20 are positioned in contacting overlying relationship to one another. Thus, the continuous strip may be positioned in an elongated fashion relative to the longitudinal axis of the tube, thereby providing a single seam which runs the length of the tube. However, it is preferred that the reinforcement strip 20 be wrapped around the inner layer region 14 at an angle between about 20° and about 80° with respect to the central axis of the inner layer region 14. The reinforcement strip 20 is spirally wrapped such that the region proximate to edge 32 is placed in overlying contact with opposed edge 34 such that the reinforcement strip forms a continuous reinforcement layer region 24 positioned in overlying relationship to the inner layer region. The reinforcement strip 20 is preferably wrapped at an angle between about 30° and about 60° with respect to the central axis of the hose with an angle between about 40° and about 50° being most preferred.

The reinforcement strip 20 may have any suitable thickness which will provide necessary strength and durability to the finished construction. Typically, the thickness of the reinforcement strip 20 is between about 0.01 mm. and about 0.2 mm., with a thickness between about 0.05 mm. and 0.1 mm. being exemplary. Generally, the reinforcement strip 20 provides a reinforcement layer which has an ultimate thickness between 0.1 mm. and 0.3 mm. with a thickness between about 0.1 mm. and 0.2 mm. being exemplary.

It is anticipated that the inner layer region 14 will have a thickness between about 0.1 mm. and 0.5 mm., with a thickness between about 0.1 mm. and 0.4 mm. being exemplary. Thus, in the preferred embodiment, the thickness of the inner layer and reinforcement layer together will be between 0.2 and 0.6 mm.

Figure 3:
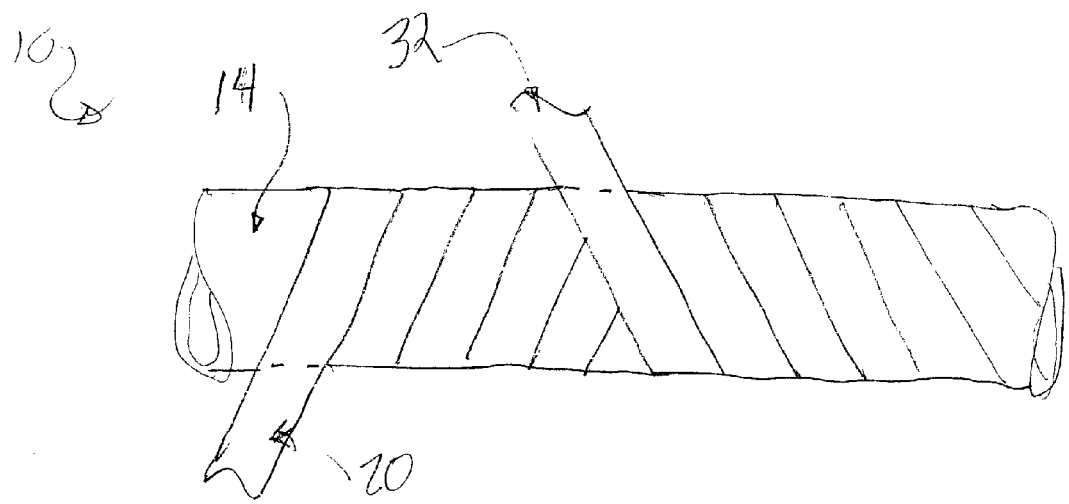
FIG. 3 is a schematic representation of the tube of the present invention depicting an extruded inner tube being wrapped by two strips, with each strip wrapped in a different direction.

The reinforcement layer 24 may contain a plurality of reinforcement strips 20 in overlying relationship to one another. As shown in FIG. 3, the hose being constructed includes a second reinforcement strip 22 which is positioned in overlying relationship radially outward of the first reinforcement strip 20. While the second reinforcement strip 22 may be wrapped at an angle or orientation similar to that of the first reinforcement layer 20, it is preferred that the second reinforcement strip 22 be staggered or wrapped around the first reinforcement layer 20 in a direction which differs from the orientational direction of the wrap of the first reinforcement strip 20. The second reinforcement strip 20 is preferably wrapped at an angle between about 30° and about 60° with respect to the central axis of the inner layer region 14, with an angle between about 40° and about 50° being preferred. As discussed previously in relation to the first reinforcement strip 20, the second reinforcement strip 22 is wrapped around the inner layer region 10 in a manner such that the opposed edges of the second reinforcement strip 22 overlap to form a continuous layer.

In constructing the multi-layer tube of the present invention, inner core tube is produced by any method such as melt extrusion processes, paste extrusion processes or the like in an essentially continuous manner. The at least one reinforcement strip is continuously wrapped around the at least one inner layer. Preferably, the at least one reinforcement strip 20 is wrapped around the at least one inner layer region 14 at a point proximate to or immediately after the coextrusion event. Without being bound to any theory, it is believed that immediate introduction and wrap of the at least one reinforcement strip 20 subsequent to coextrusion permits integration of the respective materials while the inner layer region maintains a degree of plasticity. It has been found that the at least one reinforcement strip 20 and the inner layer region 14 exhibit a degree of bonding relative to one another. This bonding is further augmented and accentuated when the reinforcement strip contains a material from the group which includes thermoplastics such as polyamide 6, polyamide 12 and polyester. Without being bound to any theory, it is believed that latent heat from the extrusion process may assist in the integration of the reinforcement strip relative to the inner layer region 14.

It is also considered within the purview of this invention that the reinforcement layer 24 include reinforcement strips of different materials. Where different materials are employed in the various reinforcement strips, it is preferred that at least one reinforcement strip contain a material from the group which includes polyamide 12, polyamide 11, polyamide 6, thermoplastic elastomers, and sheets of metal foil. At least one of the elongated strips 20 may also contain a bonding enhancing material to enhance integration of chemically dissimilar materials.

Where the elongated strip is a woven fabric or sheet, it is also within the purview of this invention to provide integration of metal wire or filament material which can be wound around the inner layer region 14 in any suitable manner such as a spiral or the like. Such metal wire may also provide electrostatic dissipation. Suitable wires can be composed of any appropriate conductive material.

If electrostatic dissipation is desired or required, it is also within the purview of this invention to provide for at least one suitably electrostatically dissipative layer in the inner layer region 14. Typically, electrostatic dissipation will be in a range less than $10^6$ ohms/sq. as measured in surface resistivity. The electrostatic dissipation can be achieved by any suitable means such as integration of elemental carbon, stainless steel, copper, silver, gold, nickel, silicon aluminum or materials of the like. It is also within the purview of this invention that the reinforcement layer may include at least one strip which is capable of electrostatic dissipation in the desired range. The electrostatically dissipative reinforcement strip 20 may include suitable conductive materials in a the manner which would be known to the skilled artisan.

The tube of the present invention may also include an outer layer 26 which is positioned radially outward from the reinforcement layer 24 in overlying relationship thereto. The outer layer 26 may be a single layer or may be composed of several individual concentric layers. Typically, the outer layer is a melt-processible thermoplastic material which is relatively resistant to interaction with the external environment and will contribute to the overall low hydrocarbon permeation rate of the resulting tube.

Figure 4:
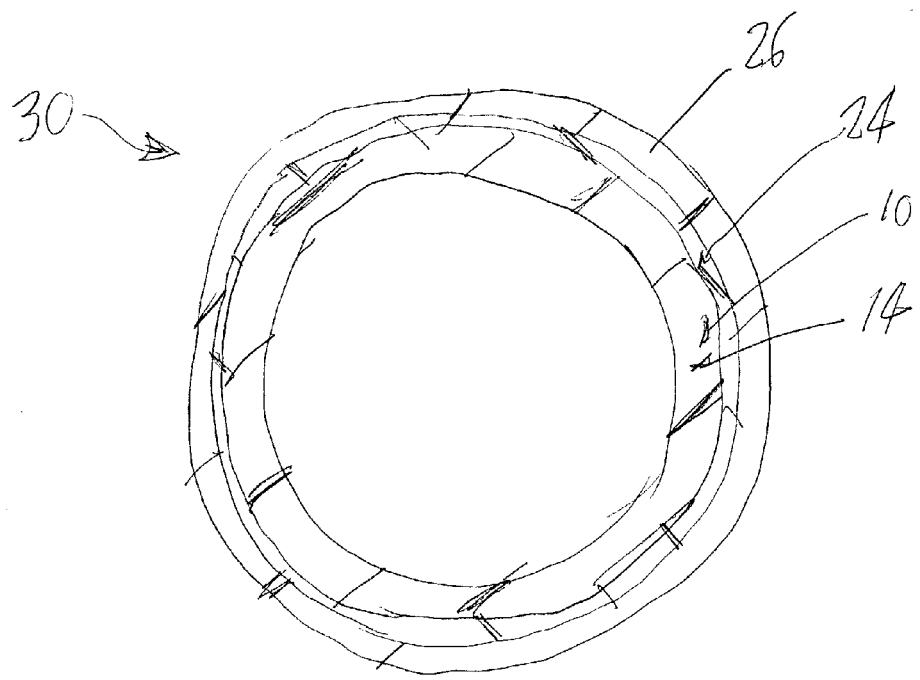
FIG. 4 is a cross-section of an additional embodiment of the tube of the present invention.

In the preferred embodiment, the at least one outer layer 26 will contain a polyamide or appropriate melt-processible thermoplastic elastomer. Preferred polyamides are those from the group which include nylon 6, nylon 6,6, nylon 11 and nylon 12. The at least one outer layer may have a thickness suitable for reinforcement and cushioning of the tubing construction. Typically, the outer layer region 26 will have an ultimate thickness between about 0.1 mm. and about 0.5 mm. with a thickness between about 0.1 mm. and 0.4 mm. being exemplary. The tube 30 as shown in FIG. 4 is typically one which could be effectively employed for use in various motor vehicle applications. While the tube 30 is described with particular application to use in motor vehicles, it is to be understood that the tube could be employed in various situations such as conveyance of water and other aqueous media as would or could occur in various plumbing situations.

The tubing is non-reactive within external environment and can withstand various impacts, vibrational fatigue, and changes in temperature as well as exposure to the various corrosive or degradative compounds to which it would be exposed for the normal course of operation of the motor vehicle. Suitable materials for use in the present invention may be composed of any melt-processable extrudable film or plastic material which is resistant to ultraviolet degradation, extreme changes in heat, and exposure to gasoline and its additives. The material of choice for the outer layer of the outer tube 26 may also exhibit resistance to environmental hazards such as exposure to zinc chloride, and resistance to degradation upon contact with materials such as engine oil and brake fluid.

It is anticipated that the tube 30, including the inner tube 10, the reinforcement layer 24, and the outer tube 26, would be suitable for use at an outer service temperature range between −40° C. and about 125° C., with a range of −20° C. to about 120° C. being preferred. The hose 30 thus formed will have a tensile strength of no less than 25 N/mm$^2$. The hose 30 will have a burst strength at 23° C. and 123° C. of at least 1000 psi. The hose 30 has the capability of withstanding impacts of at least two foot pounds at temperatures below about −20° C. The method for determining impact resistance for tubing as used with respect to the present invention is SAE J2260 Sec. 7.6 (Rev. 11, 1996).

When the tube construction of the present invention is employed in automotive environment, it is anticipated that the total wall thickness of the tube 30 will generally be between about 0.9 mm. and about 2.0 mm., with a wall thickness between about 1.0 mm. and about 1.5 mm. being exemplary.

As shown in FIG. 4, a cross-section of the reinforced type pressure tube 30 includes an inner layer 14, a reinforcement layer 24 wrapped around the inner layer 14 and bonded to the outer surface of the inner layer 14, and an outer tube 26 extruded over the reinforcement layer 24. The reinforcement layer 24 is bonded to the inner layer 14 and the outer tube 26 is bonded to the reinforcement layer 24. The inner layer 14 is made of a material having a low hydrocarbon permeation coefficient.

The inner layer 14 may be made of a single layer comprising a low hydrocarbon permeation material, or the inner layer 14 may comprise a multi-layer tube having a overall a low hydrocarbon permeation. The multi-layer inner region, comprises an inner layer, at least one intermediate layer bonded with the inner layer and an outer layer bonded with the intermediate layer. The outer layer of the inner layer region is preferably composed of at least one polyamide, polyester and polyphenylene sulfide. The reinforcement layer of the high pressure hose includes at least one reinforcing strip 20 wrapped in helical fashion and containing a melt-processable thermoplastic material. The outer tube 26 of the reinforced high pressure hose 30 is made of a polyamide material.

In another embodiment, the reinforced hose 30 comprises an inner tube 10 comprised of a single layer of at least one of polyamide, polyester and polyphenylene sulfide materials, a reinforcement layer 24 comprised of at least one reinforcement strip 20, and an outer tube 26 comprised of a polyamide material. The reinforcement layer 24 includes reinforcement strips 20, 22 made of a metal foil. The reinforcement strips 20, 22 are wrapped around the inner tube 10 in a manner such that the edges of a reinforcement strip 20 overlap. The reinforcement layer 24 further includes a bonding material. The bonding material is for bonding the reinforcement strips 20, 22 to the inner tube 10. The bonding material is further used to bond the outer tube 26 to the reinforcement layer 24. The tube so configured can provide a low hydrocarbon permeation rate preferably below 15 g/m$^2$day (CE 10, CM 15, SAE C fuel).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tube for conveying at least one fluid, the tube comprising:
   at least one inner layer composed of a plastic material, the at least one inner layer having an outer surface;
   at least one reinforcement layer, the reinforcement layer including at least one reinforcement strip mechanically wrapped around the outer surface of the inner layer and bonded to the outer surface of the at least one inner layer;
   wherein the reinforcement layer comprises at least one elongated strip constructed of a woven fabric, the woven fabric containing at least one of highly oriented plastic fibers and metal foil, the at least one elongated strip further comprising at least one bonding material capable of forming a bond between the at least one inner layer and at least one face of the elongated strip;
   wherein the inner layer includes:
   an innermost fluid-contacting layer having an inwardly oriented fluid contacting face capable of prolonged exposure to the fluid transported through the tube, the innermost layer consisting essentially of an extrudable thermoplastic;
   at least one intermediate layer disposed radially outward from the innermost layer, the at least one intermediate layer capable of sufficiently permanent laminar adhesion with the inner layer; and
   at least one layer positioned radially outward of the intermediate layer, the at least one layer positioned radially outward of the intermediate layer containing at least one melt-processible thermoplastic polyamide.

2. The tube as defined in claim 1 wherein the respective materials contribute to provide the tube with a tensile strength of at least 25 N/mm2 and a burst of strength at 2320 C. and 12020 C. of at least 1000 psi.

3. The tube as defined in claim 1 wherein the materials of construction contribute to provide a tube having the ability to resist impacts of at least 2 foot-pounds at temperatures below about −2020 C.

4. A tube comprising:
   at least one inner layer composed of a plastic material, the at least one inner layer having a continuous inner fluid-contacting surface and an outer surface;
   at least one reinforcement layer, the reinforcement layer including at least one reinforcement strip mechanically wrapped around the outer surface of the at least one inner layer and bonded to the outer surface of the at least one inner layer wherein the reinforcement strip includes at least one of an essentially continuous sheet of plastic material, an essentially continuous sheet of metal foil material, or woven fibers of a metal material.

5. The tube of claim 4 wherein the inner layer is composed of a thermoset material.

6. The tube of claim 4 wherein the inner layer is composed of an extrudable thermoplastic material.

7. The tube of claim 4 further comprising:
at least one outer layer composed of a melt-processible thermoplastic material, the at least one outer layer extruded over the at least one reinforcing layer, wherein the at least one outer layer bonded to the at least one reinforcing layer.

8. The tube as defined in claim 7 wherein the at least one inner layer comprises:
an innermost layer having an inwardly oriented fluid contacting face and an opposed outwardly oriented face, the innermost layer composed of at least one melt-processible thermoplastic material;
at least one intermediate layer positioned radially outward of the innermost layer, the at least one intermediate layer composed of at least one melt-processible thermoplastic material; and
at least one outer layer positioned radially outward of the at least one intermediate layer, the at least one outer layer containing a melt-processible polyamide.

9. The tube as defined in claim 8 wherein the at least one reinforcement strip comprises a polyamide sheet.

* * * * *